United States Patent [19]

Stark

[11] Patent Number: 6,039,227

[45] Date of Patent: Mar. 21, 2000

[54] GOLF BAG TRANSPORTATION APPARATUS FOR MOTOR VEHICLES

[76] Inventor: Samuel Ray Stark, P.O. Box 1359, Lexington, Okla. 73051

[21] Appl. No.: 09/216,159

[22] Filed: Dec. 18, 1998

Related U.S. Application Data

[60] Provisional application No. 60/102,746, Oct. 2, 1998.

[51] Int. Cl.$^7$ ....................................................... B60R 9/00
[52] U.S. Cl. ..................... 224/521; 206/315.3; 224/274; 224/504; 224/506; 224/511; 224/519; 224/525; 224/531; 224/532
[58] Field of Search ..................................... 224/521, 274, 224/525, 504, 506, 511, 519, 523, 527, 530, 531, 532, 488, 917.5, 924; 206/315.3; 150/159; 248/96; 280/DIG. 5, DIG. 6

[56] References Cited

U.S. PATENT DOCUMENTS

| | | | |
|---|---|---|---|
| 2,497,597 | 2/1950 | Gatewood | 224/526 |
| 4,809,891 | 3/1989 | Patrin | 224/527 |
| 4,938,399 | 7/1990 | Hull et al. | 224/521 |
| 5,092,503 | 3/1992 | Cocks | 224/519 |
| 5,146,967 | 9/1992 | Chapman | 150/159 |
| 5,190,195 | 3/1993 | Fullhart et al. | 224/497 |
| 5,368,209 | 11/1994 | Hill | 224/497 |
| 5,460,304 | 10/1995 | Porter et al. | 224/521 |
| 5,794,959 | 8/1998 | Scheef, Jr. | 280/400 |
| 5,806,738 | 9/1998 | D'Angelo | 224/521 |

FOREIGN PATENT DOCUMENTS

| | | | |
|---|---|---|---|
| 2062999 | 9/1992 | Canada | 224/502 |

Primary Examiner—Gregory M. Vidovich
Assistant Examiner—Maerena Brevard
Attorney, Agent, or Firm—James F. Harvey, III

[57] ABSTRACT

A golf bag carrier suitable for carrying golf bags external to a motor vehicle equipped with a standard square tube trailer hitch receptacle permanently mounted to the frame and under the rear bumper of said vehicle is described. The golf bag carrier consists of a substantially rectangular pan assembly upon which the golf bag is vertically placed; a trailer hitch shank which is telescopically received by the standard square tube trailer hitch receptacle mounted to the motor vehicle, said shank being affixed to the bottom of said rectangular pan assembly; a second standard square tube trailer hitch receptacle affixed to the bottom of the rectangular pan assembly and coaxial with its trailer hitch shank, a vertical member detachably attached to the rectangular pan; and a horizontal member detachably attached to the top end of the vertical member and having a plurality of horizontal support arms for stabilizing the golf bag being transported. The vertical member and horizontal member can be disassembled and loosely placed in the rectangular pan of the golf bag carrier for compact storage of the apparatus. The golf bag carrier can be used alone or as part of a system of accessories suitable for adapting the golf bag carrier to a variety of configurations, for use with other devices. Other devices having a trailer hitch shank, such as a second golf bag carrier or a bicycle carrier, can be attached to the golf bag carrier by means of its trailer hitch receptacle, thus permitting multiple devices to be utilized simultaneously for transportation purposes.

4 Claims, 3 Drawing Sheets

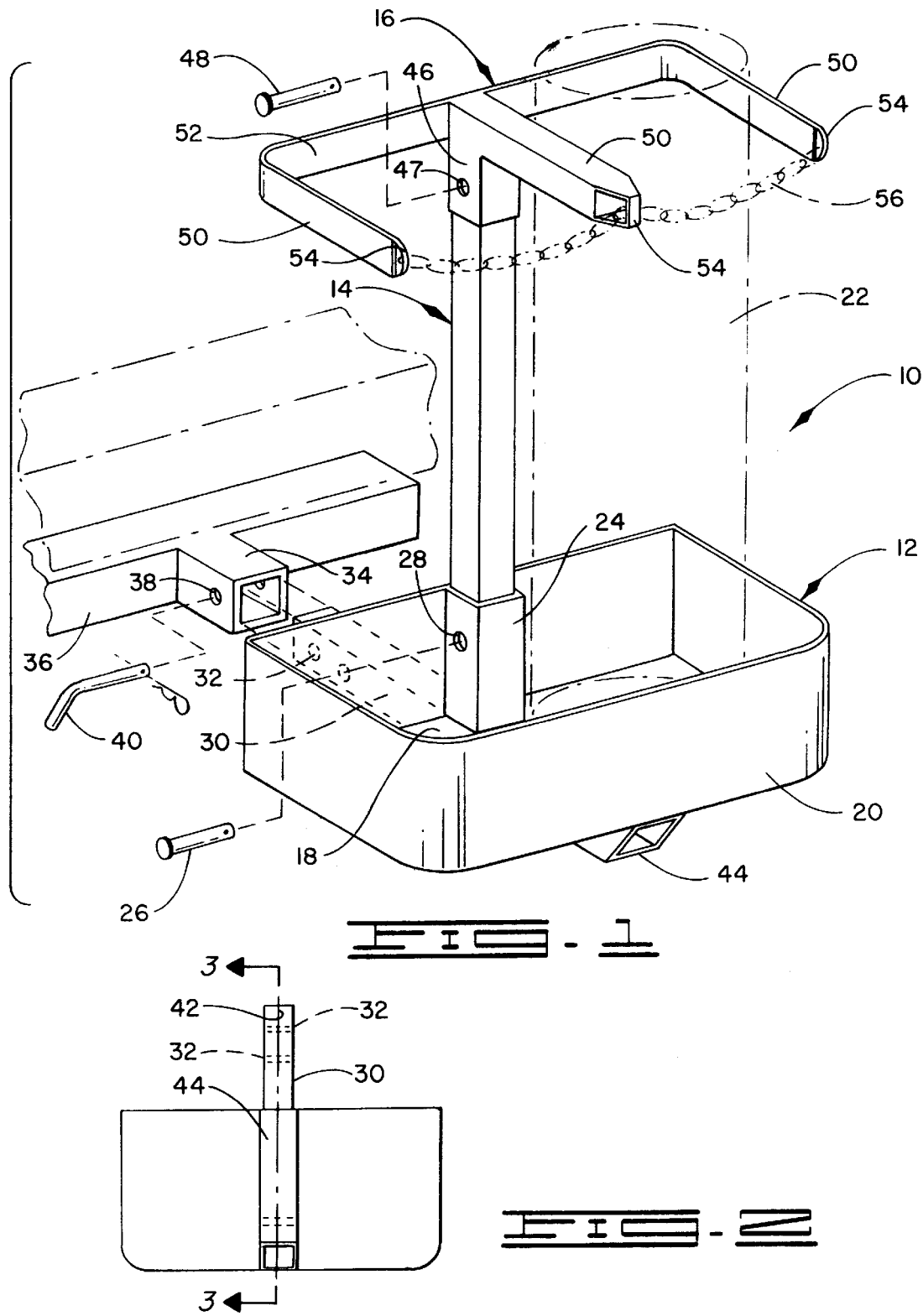

GOLF BAG TRANSPORTATION APPARATUS FOR MOTOR VEHICLES

CROSS-REFERENCES TO RELATED APPLICATIONS

This application claims priority based on provisional application Serial No. 60/102,746, filed Oct. 2, 1998.

BACKGROUND

A. Field of the Invention

The present invention relates generally to article carriers adapted to be detachably attached to motor vehicles for the purpose of external transportation of bulky objects such as wheelchairs, skis, bicycles, and the like. More specifically, the invention relates to an article carrier specifically adapted for transporting golf club bags by means of a detachable base and column design which is interconnected to a standard square tube trailer hitch receptacle. The invention also has provision for the attachment of a second device in tandem with the golf bag carrier, whereby attachment is effected by means of a standard square tube trailer hitch receptacle integral to the golf bag carrier. Examples of such second devices are other article carriers, such as bicycle carriers or ski racks, trailer hitches, and the like, so that the golf bag carrier can be used simultaneously with the second device when the user desires to transport different types of articles.

B. Description of the Related Art

Devices for carrying bulky objects such as bicycles, wheelchairs, skis, and other such cargo on the back bumper of a motor vehicle have been known to the art. These devices have been attached to the motor vehicle by various means, such as wing nuts (Smith, 1919, U.S. Pat. No. 1,313,959), clamps (Fulhart et al., 1993, U.S. Pat. No. 5,190,195), or square tubular members attached to the device and received by a square tubular trailer hitch receptacle permanently attached to the motor vehicle (Liscinsky, 1994, U.S. Pat. No. 5,310,100). With the exception of the Smith patent, which was designed for the bumper of early, relatively low speed vehicles, use of such devices for carrying golf bags was not envisioned by any of the subsequent patents. Devices specifically for carrying golf bags have been confined to low speed vehicles such as golf carts for use on a standard golf course.

Thus the problem of transporting golf bags around the golf course in a relatively benign environment has been solved, but the problem of transporting the golf bags from the residence or the transportation terminal (airport, train station, bus station, etc.) to the golf course remains. This latter problem is most evident when the trunk of the motor vehicle is filled to capacity with the suitcases and other personal effects of the occupants and there is no room for a bulky golf bag. Generally, golf club bags are too wide for many trunks and must be transported in the back seat. The problem is compounded, however, when there are three or four occupants in the vehicle. They must either carry the golf bags in their laps or on top of the vehicle, or else they must use two or more vehicles. If the bags are carried on top of the vehicle, the extra precautions must be taken to prevent the clubs, now lying in a horizontal position, from sliding out of the bags. If multiple vehicles are used, then expense of vehicle rental, parking, and gasoline is increased.

Several issues present themselves when addressing the problem of trying to carry golf bags on the back of high speed motor vehicles. First, devices used for carrying golf bags on the rear of a motor vehicle must be rugged enough to withstand rocks and other road debris which may be thrown up against the golf bag and damage it or its contents. Designs for use on golf carts are relatively open and not conducive for such an environment. Their construction is light so that they do not degrade golf cart mobility.

Second, such devices must be easily removable from the vehicle. The motor vehicle has other uses than for carrying golf bags, which may be only a weekly or monthly occurrence. The trailer hitch may be required to perform other functions, such as towing trailers or carrying different articles, e.g. bicycles.

Third, such devices must be easily broken down and disassembled for storage. After it is detached from the vehicle, it must be stored, generally in the garage, in a compact manner which does not take up much room and which does not present awkward protruding bars which catch on other stored articles or passers by. Such devices should also be easily assembled and disassembled without special tools.

Fourth, such devices generally have a fixed capacity in terms of number of golf bags they are designed to accommodate. A compact device for transporting a single bag of a golfer who is meeting his foursome at the course is different from a more bulky device designed for carrying the bags of the entire foursome. In order to prepare for the worse case, the golfer must either own two carrying devices, a small capacity carrying device and a large capacity carrying device, or else he must buy a large device and use it continuously.

Fifth, devices attached to the rear of motor vehicles must meet legal requirements for road use. They cannot be so wide as to obscure the view of the vehicle's taillights and brake lights. Furthermore, the license plate must be visible as well.

Sixth, there may be other article carriers which are desirable to use with the golf bag carrier when, say, going on a family vacation or traveling between the home and the golf course. For example, many golfers also have a golf cart and trailer which they transport to the golf course. If a golf bag equipment carrier uses the trailer hitch receptacle, then the receptacle cannot be used for other purposes. In other words, by its nature, the trailer hitch receptacle can only be used by one device at a time.

A device for carrying golf bags on the back of motor vehicles is needed which will meet the following criteria:

1. The device must be of rugged construction to withstand the harsh road environment.
2. The device must be easily removed from the vehicle when the vehicle is employed for other uses besides transportation of golf bags.
3. The device must be easily configurable for carrying single or multiple golf bags.
4. The device must be amenable to easy disassembly into a compact configuration for storage, either by the end user or by the wholesale distributer or the retail store prior to sale. The latter consideration helps reduce warehousing costs in the commercial distribution channels.
5. The device must not obscure the taillights or the license plate of the motor vehicle so that it may be legally allowable for highway and road use.
6. The device should be adaptable for use with other similar devices requiring a trailer hitch receptacle so that both can be used as the need arises.

SUMMARY

It is therefore an object of the present invention to present invention to provide a safe, rugged means for transporting golf bags to and from the golf course without damaging them through road debris or exposing them to damaging wind or rain environmental conditions.

Another object of the invention is to provide a golf bag carrier which can be easily removed from the motor vehicle without use of special tools or apparatus.

Another object of the invention is to provide a golf bag carrier which can be easily disassembled without use of special tools.

Another object of the invention is to provide a golf bag carrier design which will allow it to be stored in a compact, space efficient manner.

Another object of the invention is to provide a golf bag carrier which can be configured to carry any number of golf bags up to four.

Another object of the invention is to provide a device which will permit the use of other article carriers to be used in concert with the invention, including a second instance of the invention itself.

Another object of the invention is to provide a golf bag carrier system, whereby the golf bag carrier may be used in conjunction and simultaneously with other devices which use a rectangular trailer hitch receptacle for attachment to a motor vehicle.

These objects of the invention are achieved by a golf bag carrier which has been designed to be detachably attached to the vehicle by a standard, square tube trailer hitch permanently affixed to the frame of the motor vehicle, receiving a square tube member which is a permanent component of the golf bag carrier. The golf bag carrier has a second component consisting of a standard square tube trailer hitch receptacle which can receive the square tube member of a either second such golf bag carrier, other different article carrier, or a trailer hitch ball device. In this way, the golf bag carrier assembly can accommodate additional golf bags by daisy chaining additional golf bag carriers in this manner, until the legal limit for extensions beyond the rear bumper of a motor vehicle is reached. Additional article carriers may be used with the golf bag carrier when different types of bulky objects are to be transported simultaneously, such as other sports equipment, trailers, bicycles, and the like. Additional optional device enhancements are provided to allow the golf bag carrier to be further adapted for various uses, so that the golf bag carrier and the device enhancements comprise a system for carrying objects from the trailer hitch receptacle.

BRIEF DESCRIPTION OF THE DRAWINGS

FIG. 1 shows a perspective view of an embodiment of the invention showing its major components.

FIG. 2 shows a bottom view of the same embodiment of the invention, illustrating the manner in which the trailer hitch receptacle and the trailer hitch shank are affixed and aligned to the invention.

FIG. 5 is a configuration diagram illustrating the manner in which other articles utilizing the standard trailer hitch shank may be interconnected with the invention and used in a daisy-chain fashion.

Figure 3:
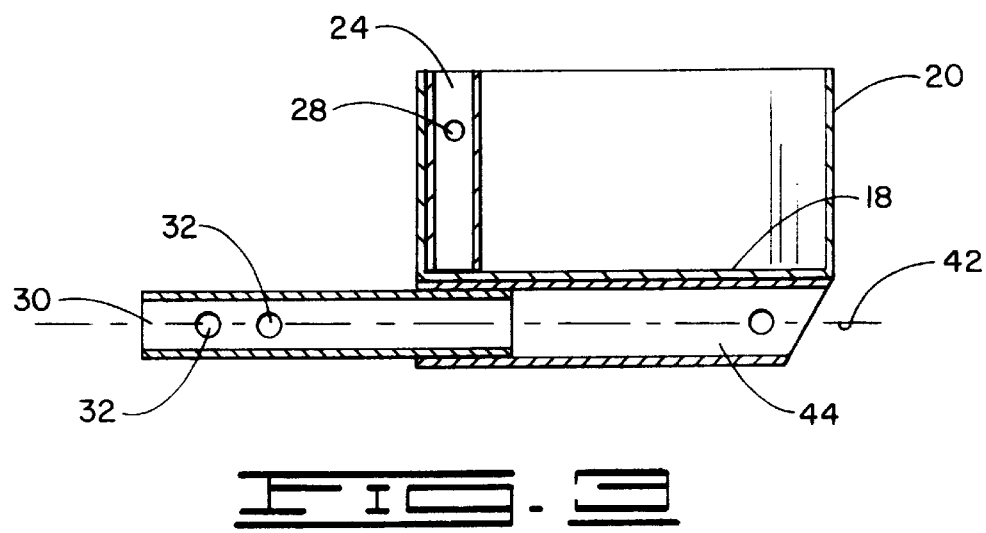
FIG. 3 shows a cross sectional bottom view taken from FIG. 2, illustrating the manner in which the trailer hitch receptacle and the trailer hitch shank are affixed and aligned to the invention.

LIST OF PARTS 10 golf bag carrier
12 base pan
14 vertical member
16 top member
18 pan floor
20 pan wall
22 golf bag
24 base pan socket
26 base pin
28 lower holes
30 trailer hitch shank
32 shank holes
34 vehicle trailer hitch receptacle
36 hitch mount
38 apertures
40 pin
42 center line
44 carrier trailer hitch receptacle
46 upper socket
47 upper holes
48 upper pin
50 arm
52 horizontal member
54 metal loop
56 containing means
58 cover
60 commercially available article carrier
70 trailer ball apparatus
71 trailer ball shank
72 trailer ball
80 license plate apparatus
81 short trailer hitch shank
82 vertical backing
83 license plate holder
84 light fixture
85 license plate
86 cable hookup

DETAILED DESCRIPTION OF THE PREFERRED EMBODIMENTS

Referring to FIG. 1, which presents a perspective view of the golf bag carrier 10, consisting of three separate parts, i.e. the base pan 12, a vertical member 14, and a top member 16.

The base pan 12 consists of a generally rectangular pan floor 18 of a size large enough to allow two standard golf bags to be placed comfortably upon it. It is constructed of heavy gauge material such as sheet iron and surrounded at its perimeter by a pan wall 20 of sufficient height to prevent a golf bag 22 placed in a vertical position on the pan floor 18 from being bounced out of the base pan 12 by road vibration or bumps. Against the interior of the pan wall 20, at the point closest to the vehicle to which the golf bag carrier 10 is attached, is a base pan socket 24 to receive the vertical member 14. Vertical member 14 is removably secured in the base pan socket 24 by base pin 26 inserted transversely through coaxial lower holes 28 in both the vertical member 14 and the walls of the base pan socket 24. Base pin 26 may be secured in place by any suitable means known to the art, such as a cotter pin inserted through a hole in its end, to prevent base pin 26 from falling out of its position in lower holes 28 while at the same time permitting easy removal without the use of tools. Although base pin 26 is depicted in the drawing as being secured in place by means of a head and cotter pin arrangement, any other suitable means for securing the pin in place may be used.

Referring now to FIG. 1 and FIG. 2, along the bottom of and exterior to base pan 12 is a square trailer hitch shank 30 having one or more sets of shank holes 32. Shank 30 is telescopically received by a vehicle trailer hitch receptacle 34, which is an integral part of a hitch mount 36 permanently secured to the motor vehicle. As shown, vehicle trailer hitch receptacle 34 includes a plurality of apertures 38, such that pin 40 can be inserted through selected ones of apertures 38 and through shank holes 32 to secure the golf bag carrier 10 at a desired location relative to hitch receptacle 34. Coaxial with the centerline 42 of the trailer hitch shank 30 is the carrier trailer hitch receptacle 44. It has the same profile and design as the vehicle trailer hitch receptacle 34 and is intended to receive the trailer hitch member of a second golf bag carrier, that of a trailer hitch ball mount, or that of some other commercially available article carrier.

Trailer hitch shanks and receptacles are generally found in three standard sizes, the choice of which depends upon the weight of the device being accommodated. A class III receptacle measures two inches square, a Class II receptacle measures one and one-half inches square, and a Class I receptacle measures one and one-quarter inches square. It has been found that, for the sake of safety, the Class III receptacle is the best mode for use with the golf bag carrier 10 since the golf bag carrier 10 tends to be rugged and relatively heavy.

Returning to FIG. 1, vertical member 14 is received on its lower end by base pan socket 24 and at its upper end by the upper socket 46 in top member 16. Vertical member 14 is removably secured in the upper socket 46 by upper pin 48 inserted transversely through coaxial upper holes 47 in both the vertical member 14 and the walls of upper socket 46. Upper pin 48 may be secured in place by any suitable means known to the art, such as a cotter pin inserted through a hole in the pin, to prevent it from falling out of its position in upper holes 47 while at the same time permitting easy removal without the use of tools. Although upper pin 48 is depicted in the drawing as being secured in place by means of a head and cotter pin arrangement, any other suitable means for securing the pin in place may be used.

Top member 16 has three arms 50 which are perpendicular to upper socket 46. An arm is connected to the either end of horizontal member 52 of the top member 14 and to the middle of the horizontal member 52 of the top member 14. The three arms 50 are spaced in such a way as to accommodate the upper part of a standard golf bag 22 between each adjacent pair of arms 50. A metal loop 54 is attached to the end of each arm 50 so that a containing means 56, such as chain, cable, rope, strap, or other suitable means of security, may be inserted to prevent the golf bag 22 from becoming dislodged from between arms 50.

Figure 4:
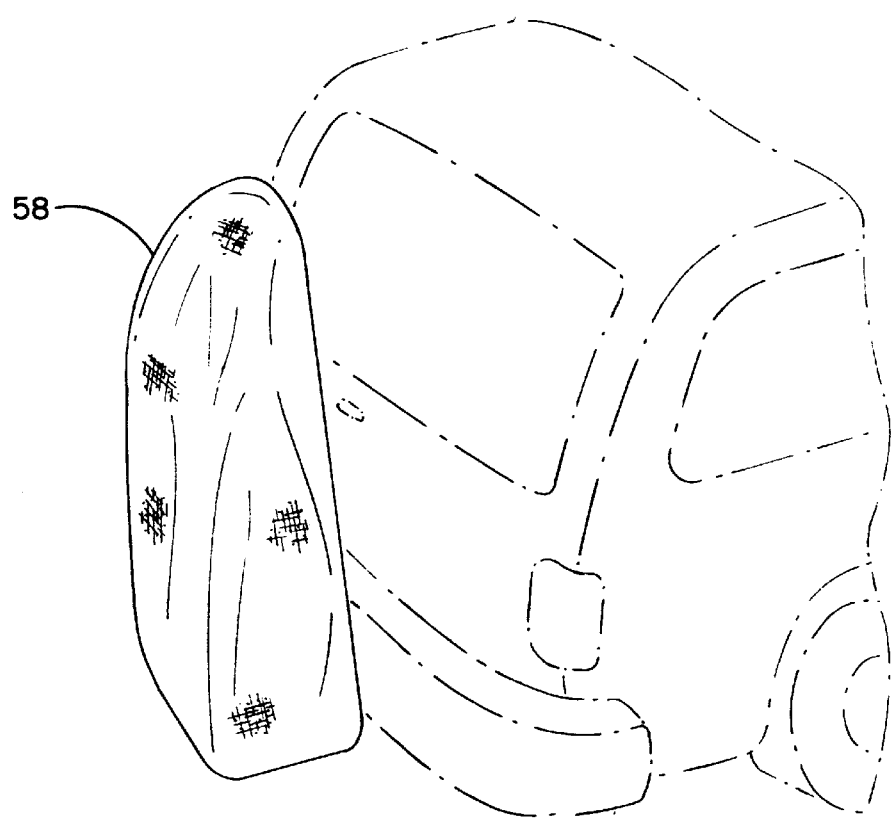
FIG. 4 illustrates how a protective cover which encloses the entire invention may be employed.
Figure 9:
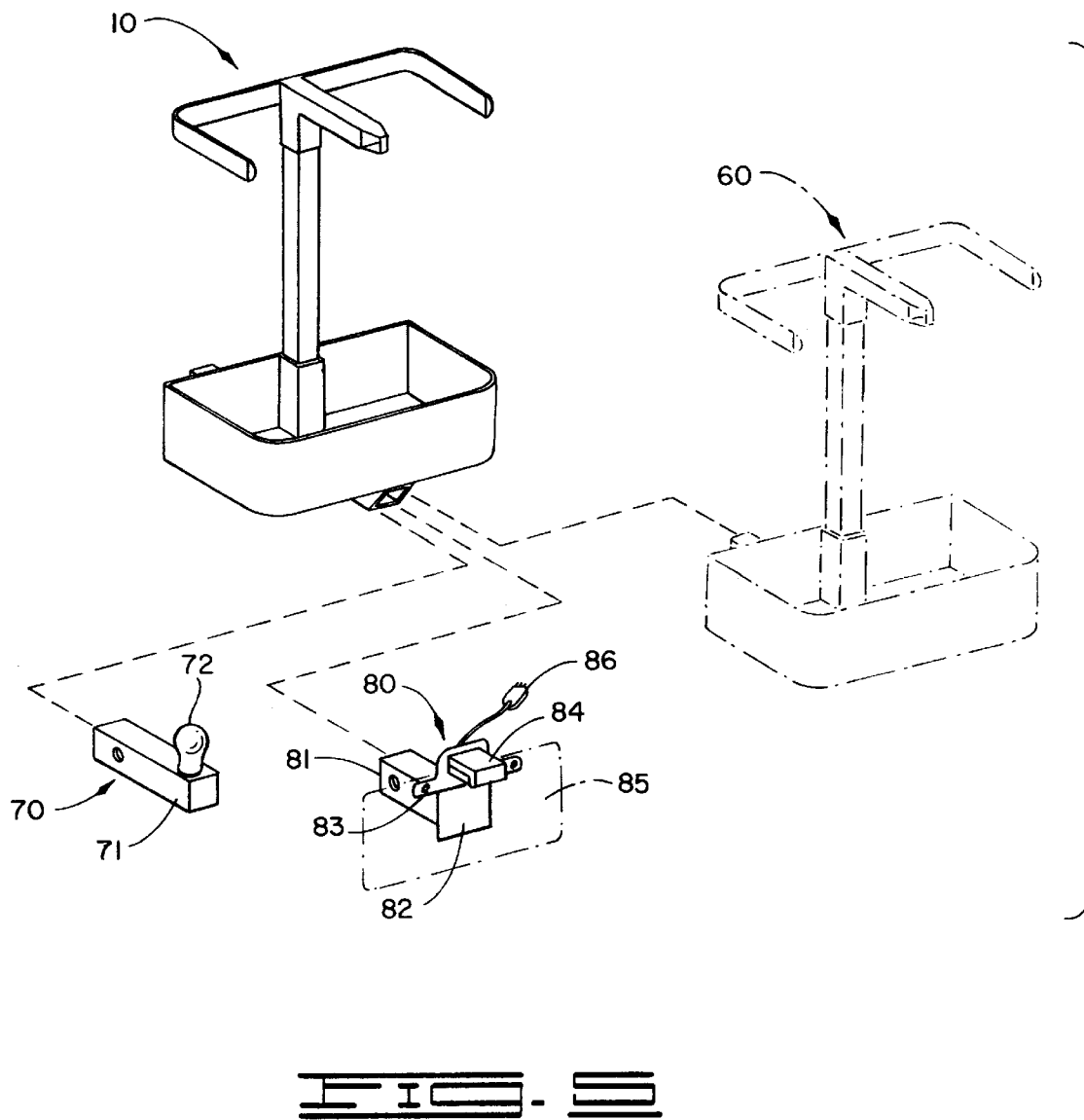

Referring to FIG. 4, a cover 58 made of some suitable, durable material which can withstand the environmental elements, such as canvas, leather, tarpaulin, plastic, or other like material, fits over the entire assembly and is secured to the base pan 12 by standard means known to the automobile art, such as snaps, straps, clips, straps employing the hook-and-loop securing system of the type sold under the trademark "VELCRO", or other suitable means. The cover 58 prevents water and other road debris from damaging the golf bags contained therein. Optionally, the cover 58 may be omitted for convenience.

The proportions of the three main parts of the golf bag carrier 10, i.e. the base pan 12, a vertical member 14, and a top member 16, are proportionately sized so that, when upper pin 48 and base pin 26 are removed and the three main parts are disassembled from one another, vertical member 14 and top member 16 will comfortably nest within the confines of the pan wall 20 of base pan 12 without protruding above the plane of the top of the pan wall 20, so that the golf bag carrier 10 may be compactly stored or shipped.

The preferred embodiment of golf bag carrier 10 accommodates two golf bags placed vertically on their ends in a side-by-side configuration. However, other embodiments of the golf bag carrier 10 could extend the width of base pan 12 and the addition of additional arms 50 so that three or four golf bags may be carried. It has been found that a base pan 12 with a width in excess of that which will accommodate two golf bags could unacceptably torque the trailer hitch shank 30, and thereby render the golf bag carrier 10 susceptible to damage.

Referring to FIG. 5, carrier trailer hitch receptacle 44 allows additional accessories employing trailer hitch shanks to be used in tandem with the present invention. First, any other commercially available article carrier 60 having a standard trailer hitch shank can be inserted into carrier trailer hitch receptacle 44, thereby allowing the golf bag carrier 10 to be interposed between the motor vehicle and the commercially available article carrier 60. Such a commercially available article carrier 60 might be one suitable for transporting bicycles, skis, or wheelchairs. Additionally, the commercially available article carrier 60 may also be a second golf bag carrier identical to the invention. Legal limitations as to the amount of clearance behind a motor vehicle limit the number and configuration of such commercially available article carriers 60.

Another accessory which might be used in conjunction with the invention would be a trailer ball apparatus 70. The construction of such an apparatus is well known to the industry, consisting of a trailer ball shank 71 upon which is attached a vertical trailer ball 72 of standard size and secured to the carrier trailer hitch receptacle 44 in the standard manner. By inserting a trailer ball apparatus 70 into the carrier trailer hitch receptacle 44, the golf bag carrier 10 could be used to tow a trailer containing a golf cart while at the same time transporting golf clubs using the golf bag carrier 10.

Finally, a license plate apparatus 80 may be inserted into carrier trailer hitch receptacle 44 when it is determined that the golf bag carrier 10 obscures a motor vehicle's license plate. The license plate apparatus 80 consists of a short trailer hitch shank 81 to which is vertically affixed vertical backing 82. A license plate is attached to vertical backing 82 by means of a standard license plate holder 83 of a standard type well known to the automotive. A light fixture 84 is mounted at the top of vertical backing 82 and used to illuminate a license plate 85 attached thereunder. Electricity for the light fixture is provided by a cable hookup 86 of a standard type well known to the trailer industry.

While only a preferred embodiment has been illustrated and described, obvious modifications may be made within the scope of this invention and the following claims without substantially changing its functions. Accordingly, the scope of the invention should be determined not by the embodiments illustrated but by the appended claims and their legal equivalents.

The invention claimed is:

1. A first golf bag transportation apparatus adapted for the transportation of a golf bag external to a motor vehicle, the motor vehicle having a vehicle trailer hitch receptacle, said golf bag transportation apparatus comprising the following components:

- a generally rectangular base pan having a vertically extending wall affixed to its perimeter and having a vertically oriented base pan socket;
- a vertical member having an upper end and a lower end, said lower end being received by said base pan socket and removably secured thereto by a pin horizontally inserted through aligned holes in said lower end of said vertical member and in said base pan socket, said vertical member having a length no greater than the maximum possible distance between any two arbitrarily chosen points on said vertically extending wall, whereby said vertical member may be stored within said base pan when said apparatus is disassembled;
- a horizontal member having a horizontal member socket, said horizontal member socket receiving said upper end of said vertical member, said vertical member being removably secured in said horizontal member socket by a pin inserted through aligned holes in said upper end of said vertical member and in said horizontal member socket, said horizontal member additionally having a plurality of support arms, each said support arm having a first end and a second end, each said first end being permanently connected to said horizontal member and spaced along said horizontal member at a sufficient distance to accommodate the upper end of a vertically standing golf bag between adjacent support arms, and each said second end having a means providing a point of attachment for a constraining means, whereby the golf bag is kept securely in place between two said adjacent support arms, said horizontal member having a length no greater than the maximum possible distance between any two arbitrarily chosen points on said vertically extending wall, whereby said horizontal member may be stored within said base pan when said apparatus is disassembled; and
- a trailer hitch shank permanently affixed to said base pan and adapted for insertion into the vehicle trailer hitch receptacle, said trailer hitch shank being removably secured thereto by a pin passing transversely through coaxial holes in said trailer hitch shank and the vehicle trailer hitch receptacle.

2. The golf bag transportation apparatus described in claim 1, further comprising a carrier trailer hitch receptacle coaxially aligned with said trailer hitch shank and permanently affixed to said base pan opposing said trailer hitch shank, said carrier trailer hitch receptacle having coaxial holes in opposite vertical sides thereof and adapted for removably securing a second apparatus having a second trailer hitch shank, said second trailer hitch shank being telescopically received by said carrier trailer hitch receptacle.

3. The golf bag transportation apparatus described in claim 2, further comprising said second apparatus, wherein said second apparatus is a golf bag transportation apparatus for the transportation of another golf bag external to the vehicle.

4. The golf bag transportation apparatus described in claim 2, further comprising:

- said second apparatus having a second trailer hitch shank, wherein said second trailer hitch shank has a first end and a second end, said first end of said second trailer hitch shank being telescopically received by the carrier trailer hitch receptacle and secured by a pin inserted through coaxial holes in said first end of said second trailer hitch shank and in said carrier trailer hitch receptacle;
- a vertical plate affixed to said second end of said second trailer hitch shank, said vertical plate having means adapted for mounting a standard license plate; and
- a downwardly focused lighting means, whereby the license plate is illuminated.

* * * * *